Figure 1:
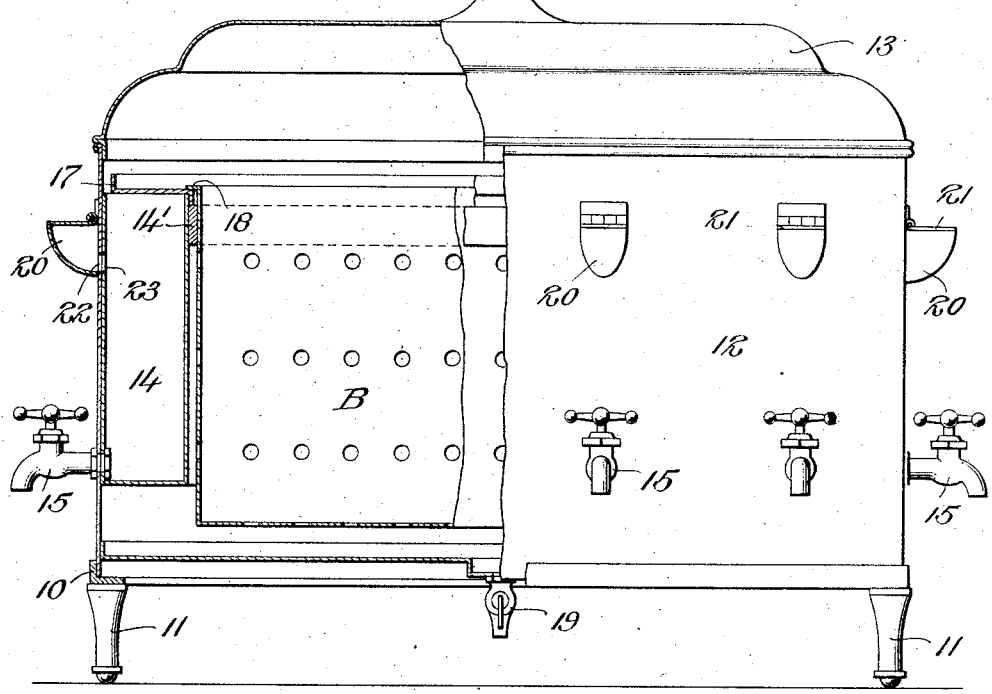

Jan. 11, 1927. 1,614,344
G. CIPPOLA
LIQUID DISPENSING APPARATUS
Filed June 7, 1926   2 Sheets-Sheet 1

Inventor
Giovanni Cippola,
by Bright & Bailey
Attorneys

Jan. 11, 1927. 1,614,344
G. CIPPOLA
LIQUID DISPENSING APPARATUS
Filed June 7, 1926 2 Sheets-Sheet 2

Inventor
Giovanni Cippola,
by Bright & Bailey
Attorneys

Patented Jan. 11, 1927.

1,614,344

UNITED STATES PATENT OFFICE.

GIOVANNI CIPPOLA, OF WORCESTER, MASSACHUSETTS.

LIQUID-DISPENSING APPARATUS.

Application filed June 7, 1926. Serial No. 114,257.

My invention relates to liquid dispensing apparatus and particularly to the general type employed for dispensing beverages such as milk, orange beverage, etc.

It is the purpose of my present invention to provide an apparatus of the type named which will enable a wide variety of beverages to be selectively dispensed from a single apparatus in a convenient and sanitary manner; which will enable ice refrigeration of the contents of the apparatus to be effectively attained; which can be easily cleaned; which will permit individual refilling of any liquid container embodied in the apparatus without opening the apparatus as a whole or any container other than the one being refilled; which will allow ready drainage of the ice compartment when desired; which will be neat and attractive in appearance; and which will be simple in construction and relatively inexpensive to manufacture.

With the above and other purposes in view my invention consists in the details of construction and in the arrangement and combination of parts to be hereinafter more fully described and particularly pointed out in the appended claims.

In the drawings chosen to illustrate my invention—

Figure 4:
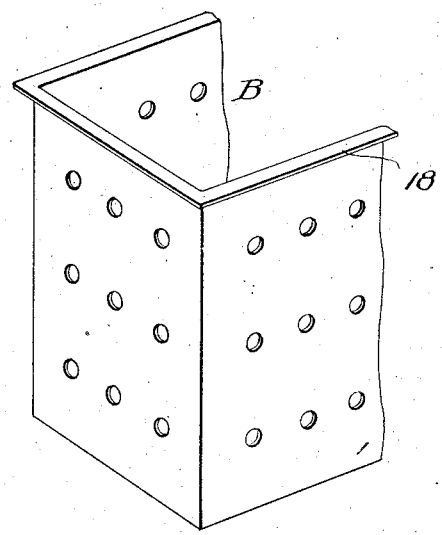
Figure 5:
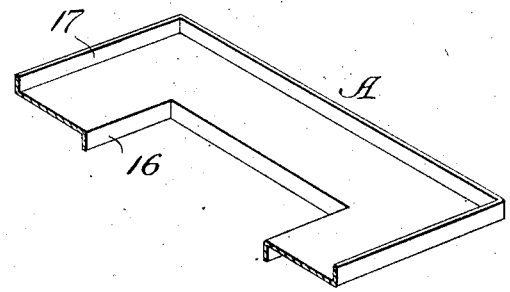
Figure 2:
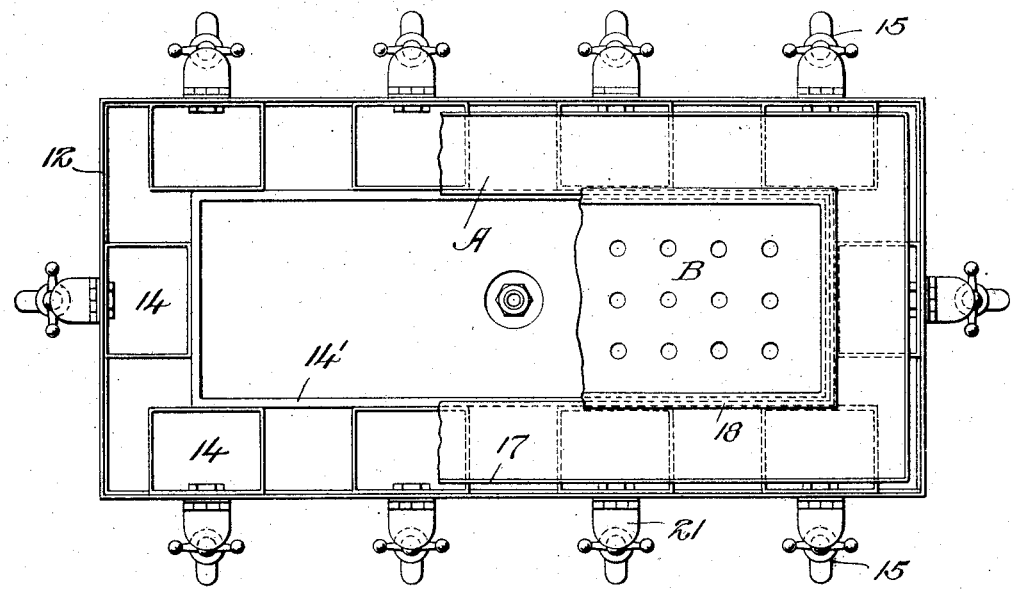
Figure 3:
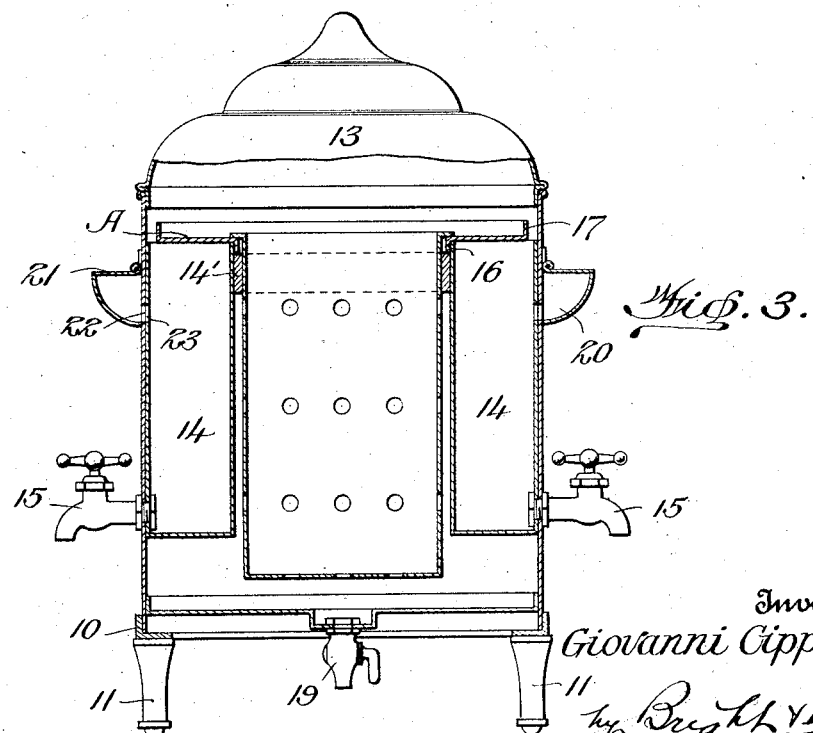

Figure 1 is a front elevation partly in section of a liquid dispensing apparatus constructed in accordance with my invention;

Figure 2, a plan view of the apparatus with certain elements broken away;

Figure 3, a transverse section of the invention;

Figure 4, a perspective view of a portion of the ice container;

Figure 5, a perspective view of a portion of the inside cover.

Referring to the drawings my improved liquid dispensing apparatus is shown as comprising a skeleton base 10 of substantially rectangular form having at the corners thereof supporting legs 11. Supported upon this base is a casing 12 having an open upper end adapted to be closed by a hinged top 13. Suitably secured against the inner faces of the side and end walls of the casing 12 in vertical spacement with respect to one another and with their bottoms spaced with respect to the bottom of the casing, is a plurality of liquid containers 14, said containers being additionally sustained in their assembled relation to the casing 12 by a rectangular brace frame 14' which is suitably secured to the outer faces of the rear walls of all the containers. Discharge of liquid from each container is controlled by a faucet 15 projecting from the outer face of the casing 12, said faucet being suitably piped to the interior of its related container with its mounting connection serving as an aid in securing said container to the casing 12.

In addition to the cover 13 I also provide an inside cover A which rests directly upon the upper edges of the containers 14. This cover A is in the form of a rectangular frame provided at its inner and outer edges with flanges 16 and 17, respectively, said flanges being oppositely directed so that when the cover is applied the flange 16 will engage against the outer face of the rear walls of the containers and hold the cover against any tendency to become displaced laterally, while the flange 17 will extend toward the upper edge of the casing 12. The outer edge of the cover A, when the latter is in place, is slightly spaced from the inner face of the vertical walls of the casing so as to allow the flange 17 to be readily gripped to effect removal of said cover when desired. This spacement of the outer edge of the cover A from the adjacent walls of the casing also serves to permit ready entrance of air into the containers as their contents is drawn off and thereby avoids the possibility of any interference with proper liquid dispensing due to partial vacuum formation in the containers above the levels of their contents.

Removably disposed in the space surrounded by the containers 14 is an ice container B whereby the contents of the containers 14 may be effectively refrigerated. This ice container B is in the form of a receptacle having an open upper end and rests directly upon the cover A through the medium of a lateral flange 18 as clearly shown in the drawing. When the container B is assembled in the apparatus its bottom is spaced with respect to the bottom of the casing 12 and perforations 18 are provided in both the bottom and side walls of said container to permit constant drainage of water formed by melting ice into the lower portion of the casing 12. To draw off accumulated water from the casing 12 I mount in the bottom of said casing a pet cock 19.

To provide for selectively refilling any container 14 without disturbing any of the assembled elements of the apparatus, I provide on the outer face of the casing 12 near the top of each container 14 a funnel spout 20 normally closed by a hinged lid 21. The interior of each spout 20 communicates with the interior of its related container 14 through registering openings 22 and 23 formed respectively in the casing 12 and the wall of the adjacent container 14. By this construction it will be apparent that by opening the lid 21 of any spout 20 the related container 14 can be readily refilled in an efficient and sanitary manner and without disturbing any of the other portions of the apparatus.

It will be observed that by the construction and arrangement of parts heretofore described I have provided a liquid dispensing apparatus which can be cleaned with facility due to the fact that by removal of the inside cover A and the ice container B, the interior of the containers 14 and casing 12 are rendered freely accessible for efficient flushing or any other method of cleaning. Furthermore, when the inside cover A and ice container B are in place said cover prevents any contamination of the contents of the containers 14, during the supplying of ice to container B, the flange 17 preventing any drippings deposited or condensed on the cover from reaching the interior of the containers 14. Also, by spacing the containers vertically with respect to each other and their bottoms horizontally with respect to the bottom of the casing I expose a relatively large amount of the surface of each container to the refrigerating effect of ice in container B with obvious advantage.

I claim:

1. In a beverage dispensing apparatus, a casing, a plurality of containers within the casing, dispensing faucets disposed exteriorly of the casing and connecting respectively with the interiors of the containers, filling spouts projecting from the outer wall of the casing and having communication with the interiors of the containers, respectively, and a hinged lid normally closing each spout.

2. In a beverage dispensing apparatus, a casing, a plurality of containers within the casing each having an open upper end, a removable cover resting upon the upper ends of the containers, said cover being of hollow frame formation having its outer edge slightly inwardly spaced from the adjacent wall of each container to provide a vent opening, a downwardly directed flange at the inner edge of the cover engaged against the adjacent walls of the containers, an upwardly directed flange at the outer edge of the cover; an ice receptacle engaged through the opening in the frame and resting on the latter, and means for selectively dispensing the contents of the containers.

3. In a beverage dispensing apparatus, a casing, a plurality of containers within and secured against the inner wall of said casing, a hollow reinforcing frame disposed within the space surrounded by said containers and secured against the adjacent walls thereof, a removable cover resting upon the upper ends of the containers, an ice receptacle engaged through said frame and having a lateral flange at its upper end resting upon said cover, and means for selectively dispensing the contents of the containers.

4. In a beverage dispensing apparatus, a casing, a plurality of containers within and secured against the inner wall of said casing with their adjacent side walls in spacement and their bottoms spaced with respect to the bottom of the casing, an ice receptacle removably supported in the space surrounded by said containers, and means for selectively dispensing the contents of the containers.

In testimony whereof I hereunto affix my signature.

GIOVANNI CIPPOLA.